(12) United States Patent  
Toukairin et al.

(10) Patent No.: US 8,513,838 B2
(45) Date of Patent: Aug. 20, 2013

(54) ELECTRIC POWER TOOL (75) Inventors: Junichi Toukairin, Hitachinaka (JP);
Takashi Takeda, Hitachinaka (JP);
Yoshihiro Komuro, Hitachinaka (JP);
Yuji Kishima, Hitachinaka (JP);
Yasuoki Kawahata, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 346 days.

(21) Appl. No.: 12/777,485

(22) Filed: May 11, 2010

(65) Prior Publication Data
US 2010/0283332 A1    Nov. 11, 2010

(30) Foreign Application Priority Data

May 11, 2009   (JP) .................. 2009-114609

(51) Int. Cl.
*H02K 7/14*     (2006.01)
*H02K 5/16*     (2006.01)
*H02K 11/00*    (2006.01)

(52) U.S. Cl.
USPC ............. 310/50; 310/90; 310/68 R; 310/58

(58) Field of Classification Search
USPC ............................................ 310/50, 90, 68 R
See application file for complete search history.

(56) References Cited

U.S. PATENT DOCUMENTS

| | | | | |
|---|---|---|---|---|
| 4,840,222 A * | 6/1989 | Lakin et al. | ...... | 165/47 |
| 5,083,052 A * | 1/1992 | Ochi | ...... | 310/64 |
| 5,939,807 A * | 8/1999 | Patyk et al. | ...... | 310/89 |
| 6,949,849 B1 * | 9/2005 | Wright et al. | ...... | 310/89 |
| 7,330,006 B2 | 2/2008 | Iwata et al. | | |
| 2006/0261689 A1 * | 11/2006 | Natsuhara et al. | ...... | 310/64 |
| 2007/0182261 A1 * | 8/2007 | Rapp et al. | ...... | 310/90 |
| 2007/0182269 A1 * | 8/2007 | Takahashi et al. | ...... | 310/217 |
| 2008/0106159 A1 * | 5/2008 | Yoshida et al. | ...... | 310/50 |
| 2008/0265695 A1 | 10/2008 | Yoshida et al. | | |
| 2009/0115266 A1 * | 5/2009 | Hatfield et al. | ...... | 310/50 |

FOREIGN PATENT DOCUMENTS

| | | |
|---|---|---|
| DE | 10 2008 020 144 A1 | 10/2008 |
| EP | 2202877 A2 | 6/2010 |
| FR | 1531257 | 6/1968 |
| GB | 1120980 | 7/1968 |
| JP | 2006-297532 | 11/2006 |
| WO | WO 2008156185 A1 * | 12/2008 |

OTHER PUBLICATIONS

European Search Report issued in European Patent Application No. 10004989.9-1262, mailed Aug. 30, 2010.
Official Communication issued Mar. 7, 2013 from counterpart European Patent Application No. 10 004 989.9-1709.

* cited by examiner

*Primary Examiner* — Tran N. Nguyen
*Assistant Examiner* — Alex W Mok
(74) *Attorney, Agent, or Firm* — McDermott Will & Emery LLP (57) ABSTRACT An electric power tool includes: a motor including a motor shaft; a tip tool driven by the motor; a housing that houses the motor; a switching element for driving the motor; and a bearing that can retain the motor shaft. The switching element is provided so as to overlap with the bearing in a direction of the motor shaft inside the housing.

15 Claims, 6 Drawing Sheets

PLAN VIEW OF INVERTER CIRCUIT BOARD ALONG LINE A – A IN FIG. 1

SECTIONAL VIEW ALONG LINE B - B IN FIG. 3

ELECTRIC POWER TOOL

CROSS-REFERENCE TO RELATED APPLICATION

This application claims the benefit of Japanese Patent Application No. 2009-114609, filed May 11, 2009, the entire disclosure of which is incorporated by reference herein.

FIELD

This application relates generally to an electric power tool employing a brushless motor as a drive source. The present application can also be applied to, in addition to electric power tools for tightening and/or hole-opening such as an impact driver, driver drill, percussion drill, or hammer drill, other electric power tools using a brushless motor, such as a circular saw and jigsaw.

BACKGROUND

For example, as disclosed in Patent Literature 1 described below, there is publicly known an electric power tool that adopts a brushless motor (brushless DC motor) as a drive source. The brushless motor displays high efficiency when compared with a commutator motor, and when used in a cordless-type electric power tool using a rechargeable battery (battery pack), operation time of the electric power tool per charge is increased when compared with use of the commutator motor. Also, the electric power tool using a brushless motor is mounted with a drive control circuit for the motor, which includes a microcomputer and the like, and therefore this type of electric power tool uses electronic control to facilitate advanced rotational control of the motor.

As well known, the brushless motor includes: a magnet rotor provided with a permanent magnet; a stator provided with multiple-phase stator coils such as three-phase coils; a plurality of magnetic sensors respectively including Hall ICs for detecting a rotor position by detecting magnetic force of the permanent magnet of the rotor; and an inverter circuit board that uses a plurality of semiconductor switching elements (for example, 6 elements) such as MOSFETs (insulating gate field-effect transistors), IGBTs (insulating gate bipolar transistor), or the like to switch DC voltage, convert the DC voltage into a three-phase AC voltage, and thereby apply current to the respective phase stator coils. The plurality of magnetic sensors correspond to the multiple-phase stator coils, and the brushless motor is configured to set a current application timing for each of the multiple-phase stator coils on the basis of a rotor position detection result by each of the magnetic sensors.

In the brushless motor, a large current is applied to each of the semiconductor switching elements (power transistors) mounted on the inverter circuit board, so that a power loss is increased to thereby increase a calorific value of the semiconductor switching element. When the calorific value of the semiconductor switching element is increased, the inverter circuit board, the semiconductor switching elements mounted on the inverter circuit board, and other circuit elements are raised to high temperature to receive thermal damage, which causes deterioration or breakage.

For this reason, as disclosed in Patent Literature 1, an approach has been considered, in which, in order to forcibly cool the semiconductor switching elements mounted on the inverter circuit board housed in a body housing portion of the electric power tool, the semiconductor switching elements on the inverter circuit board are disposed in proximity to an outer peripheral portion of a cooling fan attached to a motor rotation shaft to thereby actively radiate heat produced in the semiconductor switching elements.

[Patent Literature 1] Unexamined Japanese Patent Application KOKAI Publication No. 2006-297532

However, when the brushless motor adopting the power transistors including radiation fins as the semiconductor switching elements as described above is adopted for an electric power tool, the inverter circuit board mounted with the semiconductor switching elements must be installed in proximity to the motor main body in the body housing portion housing the motor portion. For this reason, a problem of increasing the overall length of the body housing portion arises, or a problem of increasing a circumferential dimension of the motor rotation shaft in the body housing portion arises. As a result, it is difficult to improve the overall axial length or radial dimension in the body housing portion of the electric power tool so as to achieve reduced and compact one, and operation or workability characteristics of the tool are adversely affected.

In particular, when a high-output power transistor such as a MOSFET is adopted as the semiconductor switching element on the inverter circuit as disclosed in Patent Literature 1, it is necessary to improve a heat radiation effect by independently mounting the power transistor in a perpendicular orientation to the inverter circuit board using an insertion mounting technique on a lead line of the power transistor, and by providing a heat radiation plate (heat sink) on a drain electrode side, and consequently there arises a problem that the overall axial length of the body housing portion is increased. For this reason, it is required to reduce the overall axial length of the body housing portion in view of the operation or workability characteristics of the tool.

It is therefore an object of the present invention to provide an electric power tool that has a low overall length of a body housing portion and adopts a brushless motor.

Another object of the present invention is to provide an electric power tool that has a high cooling effect on a semiconductor power transistor on an inverter circuit board disposed in a body housing portion.

SUMMARY

In order to achieve the above objects of the present invention, features of representative ones of inventions disclosed in the present application are described as follows:

(1) An electric power tool according to a first aspect of the present invention includes: a motor including a motor shaft (motor rotation shaft); a tip tool driven by the motor; a housing that houses the motor; a switching element for driving the motor; and a bearing that can retain the motor shaft, wherein the switching element is provided so as to overlap with the bearing in a direction of the motor shaft inside the housing.
(2) The housing may include a motor housing portion that houses the motor, and a grip housing portion that extends downward from the motor housing portion; and the bearing and the switching element may be provided in the motor housing portion.
(3) The housing may be a left and right dividable housing; and the bearing may be retained by a rib that is provided in the motor housing portion and extends in a horizontal direction.
(4) The motor shaft may be provided so as to be substantially orthogonal to a circuit board.
(5) A plurality of the switching elements may be provided; and a portion of the switching elements may be provided in a prone state on the circuit board, whereas another portion of the switching elements may be provided in an upright state on the circuit board, and configured to overlap with the bearing.

(6) The rib may be provided behind in the motor shaft direction with respect to the portion of the switching elements.

(7) The left and right dividable housing may be fixable by a screw extending in the horizontal direction; a screw boss for fixing the screw may be provided in the motor housing; and the another portion of the switching elements may be disposed between the screw boss and the bearing.

(8) An electric power tool according to a second aspect of the present invention comprises: a housing including a body housing portion extending from one end to the other end; a brushless motor portion that extends in a direction from the one end toward the other end in the body housing portion, and has a motor rotation shaft supported by first and second shaft bearing portions respectively provided on the one end side and the other end side in the body housing portion, and a stator coil provided on an outer periphery of an intermediate portion of the motor rotation shaft; an inverter circuit board that is mounted with a plurality of semiconductor switching elements in order to supply a power source to the stator coil, and housed on the one end side in the body housing portion; a tip tool mounting portion that is driven on a basis of a rotational output of the motor rotation shaft, and provided on the other end side of the body housing portion; and a drive power transmission portion that is provided on the other end side of the body housing portion to transmit the rotational output of the motor rotation shaft to the tip tool mounting portion, wherein: the inverter circuit board is disposed to extend in a direction that crosses a shaft direction of the motor rotation shaft in a space in the body housing portion between the first shaft bearing portion and the stator coil provided on the one end side of the body housing portion; a mounting surface for the semiconductor switching elements of the inverter circuit board is disposed so as to face the first shaft bearing portion; and first group element in the plurality of semiconductor switching elements mounted on the mounting surface of the inverter circuit board is mounted adjacently to the first shaft bearing portion in a space in the body housing portion between the mounting surface and the one end so as to have a height that exceeds a separation distance from the mounting surface to the first shaft bearing portion.

(9) Second group elements in the plurality of semiconductor switching elements mounted on the mounting surface of the inverter circuit board may be fitted in a space in the body housing portion between the mounting surface and the first shaft bearing portion so as to have a height that is lower than the separation distance from the mounting surface to the first shaft bearing portion.

(10) The first and second group semiconductor switching elements may be semiconductor power transistors respectively including insertable lead lines; the insertable lead lines of the first group elements may be fitted in a state vertical to the mounting surface of the inverter circuit board; and the insertable lead lines of the second group elements may be bent with respect to the mounting surface of the inverter circuit board, and fitted such that package surfaces of the semiconductor power transistors are brought into a state parallel to the mounting surface.

(11) The motor rotation shaft may be orthogonal to the inverter circuit board via a through hole provided in the inverter circuit board.

(12) The housing may have a handle housing portion that branches and extends from the direction of the extension of the body housing portion.

(13) The housing may be formed by tightening halved housing members with a screw extending in a horizontal direction, the halved housing members being formed by dividing the housing into two in the horizontal direction at a vertical surface crossing a central axis of the motor rotation shaft; and the first shaft bearing portion may be retained by a hole formed in a central portion of a rib that is formed on the one end of the body housing portion and extends in the horizontal direction.

(14) The second group semiconductor switching elements mounted on the inverter circuit board may be mounted in a space in the body housing portion between the rib formed on the one end and the mounting surface.

(15) The halved housing member may have a screw boss threadably engaging with the screw for tightening the halved housing members in the one end of the body housing portion; and the first group semiconductor switching elements may be fitted in proximity to the first shaft bearing portion in a space in the body housing portion between the screw boss and the first shaft bearing portion.

(16) The inverter circuit board may have the mounting surface of a circular shape, and a through hole through which the motor rotation shaft crosses, in a central portion of the circular-shaped mounting surface; the first group semiconductor switching element comprises a plurality of first group semiconductor switching elements; the second group semiconductor switching element comprises a plurality of second group semiconductor switching elements; the first group semiconductor switching elements may include two pairs of semiconductor power transistors respectively mounted in two pairs of first regions facing each other and sandwiching the through hole in a peripheral portion of the through hole in the circular-shaped mounting surface; and the second group semiconductor switching elements may include one pair of semiconductor power transistors respectively mounted in one pair of second regions facing each other and sandwiching the through hole in the peripheral portion of the through hole in the mounting surface.

(17) A mounting height of the second group semiconductor power transistors mounted in the second region of the mounting surface may be lower than a height of the first group semiconductor power transistors mounted in the first region of the mounting surface.

(18) A cooling fan using the motor rotational shaft as a rotation shaft may be provided in a space in the body housing portion between the second shaft bearing portion provided on the other end side of the body housing portion and the stator coil; and a ventilation port may be provided on the one end side of the body housing portion.

(19) According to still another feature of the present invention, an electric power tool may comprise: a brushless motor including a stator coil; a housing that houses the brushless motor; a circuit board housed in the housing; and a plurality of switching elements that comprises a first switching element and a second switching element and that are provided on the circuit board and that allows electric current to pass through the stator coil; and the first switching element may be implemented on the circuit board vertically with respect to the circuit board, and the second switching element may be implemented on the circuit board in parallel with the circuit board.

Principal effects based on the above configurations of the present invention are as follows:

According to the above configuration (1) of the present invention, the switching element is provided so as to overlap with the bearing in the direction of the motor shaft inside the housing, and thereby a length of the housing extending in the direction of the motor shaft can be shortened.

According to the above configuration (8) of the present invention, the inverter circuit board is disposed so as to extend in the direction crossing the direction of the motor rotation shaft in the space in the body housing portion between the first shaft bearing portion and the stator coil provided on the one end side of the body housing portion; the mounting surface of the semiconductor switching elements of the inverter circuit board is disposed to so as to face the first shaft bearing portion; and the first group element in the plurality of semiconductor switching elements mounted on the mounting surface of the inverter circuit board is fitted adjacently to the first shaft bearing portion in the space in the body housing portion between the mounting surface and the one end so as to have the height that exceeds the separation distance from the mounting surface to the first shaft bearing portion, so that a fitting space in the direction of the motor rotation shaft of the inverter circuit board in the body housing portion between the one end side of the body housing portion and the inverter circuit board can be shortened.

Also, according to the above configuration (18) of the present invention, the ventilation port is provided on the one end of the body housing portion, and the cooling fan is provided on the second shaft bearing portion side of the motor rotation shaft, so that it is possible to ensure a cooling effect on the plurality of semiconductor switching elements mounted on the inverter circuit board.

The above and other objects of the present invention, and the above and other novel features and effects of the present invention will be further clarified from the following description of the present specification and accompanying drawings.

BRIEF DESCRIPTION OF THE DRAWINGS

A more complete understanding of this application can be obtained when the following detailed description is considered in conjunction with the following drawings, in which.

DETAILED DESCRIPTION

An embodiment of the present invention will be hereinafter described in detail on the basis of the drawings. Note that, in all the drawings provided for description of the embodiment, members or elements having the same function are denoted by the same reference numerals, and repetitive description thereof will be omitted.

Figure 1:
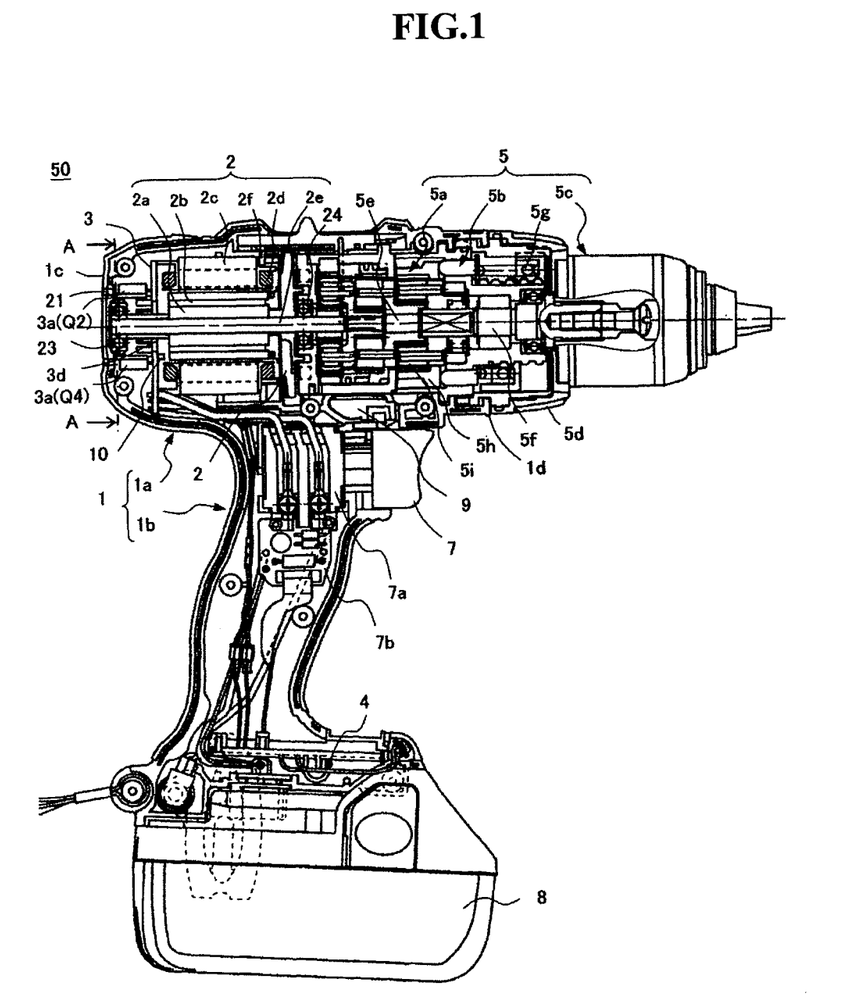
FIG. 1 is; a sectional view of the overall structure of an electric power tool according to one embodiment of the present invention.
Figure 2:
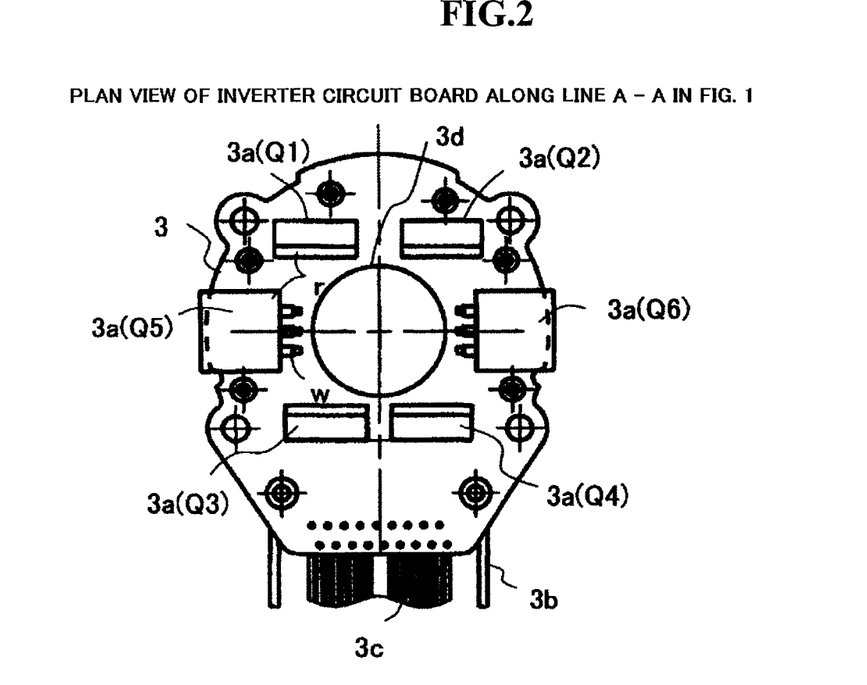
FIG. 2 is; a plan view of an inverter circuit board along the line A-A in the electric power tool illustrated in FIG. 1.
Figure 3:
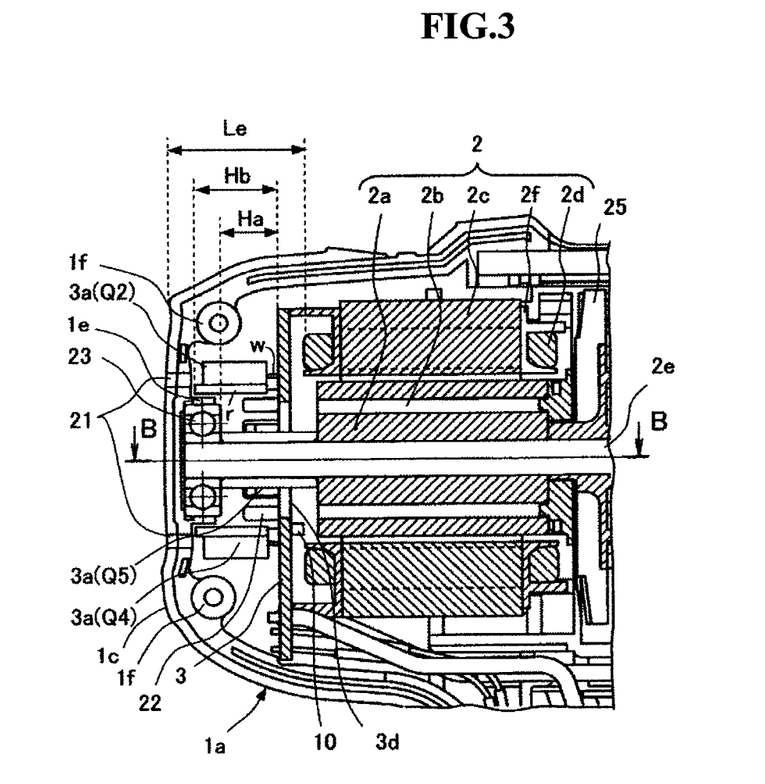
FIG. 3 is; an enlarged sectional view of the principal components of the electric power tool illustrated in FIG. 1.
Figure 4:
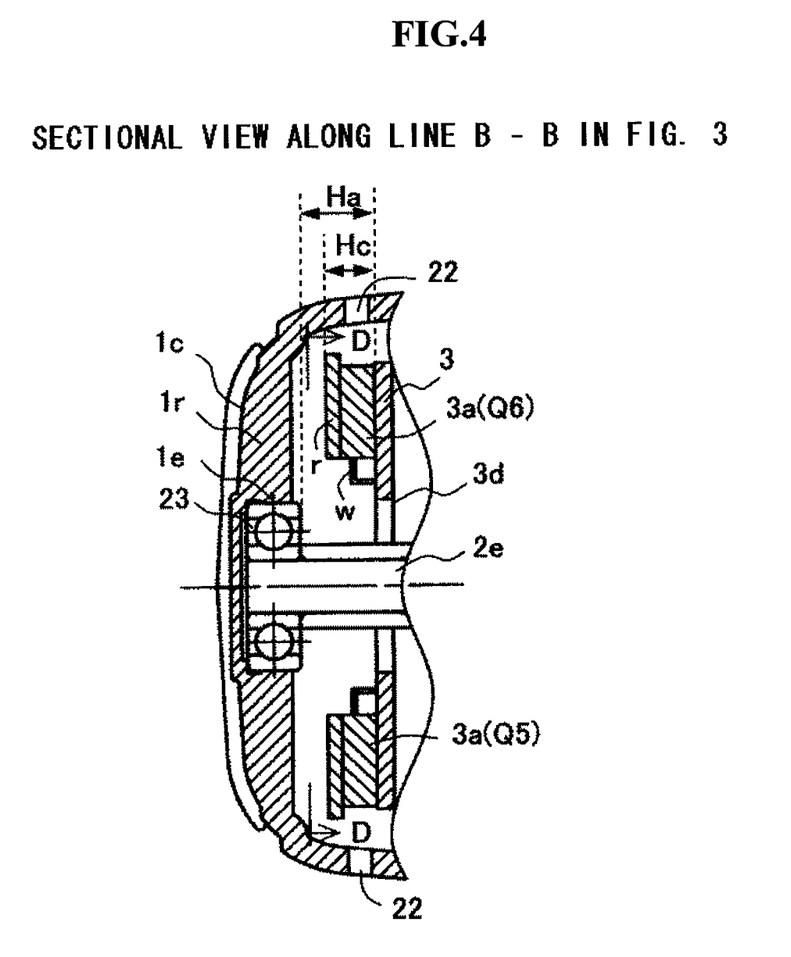
FIG. 4 is; a sectional view of the principal components of the electric power tool illustrated in FIG. 3.
Figure 5:
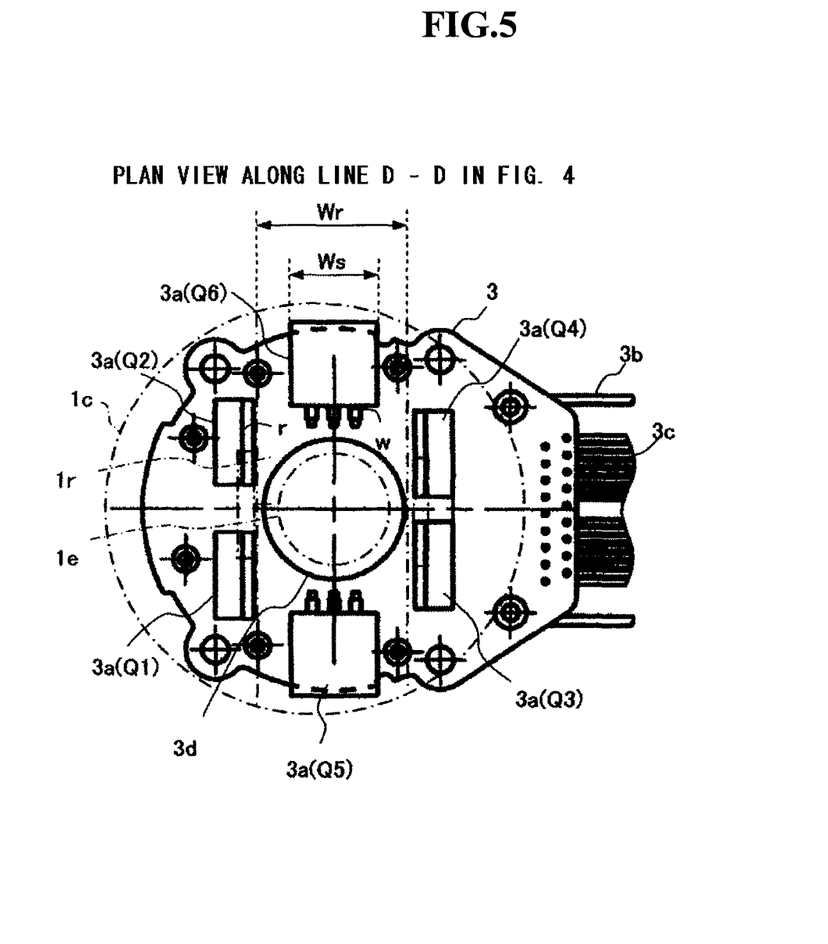
FIG. 5 is; a plan view of the inverter circuit board along the line D-D in FIG. 4.
Figure 6:
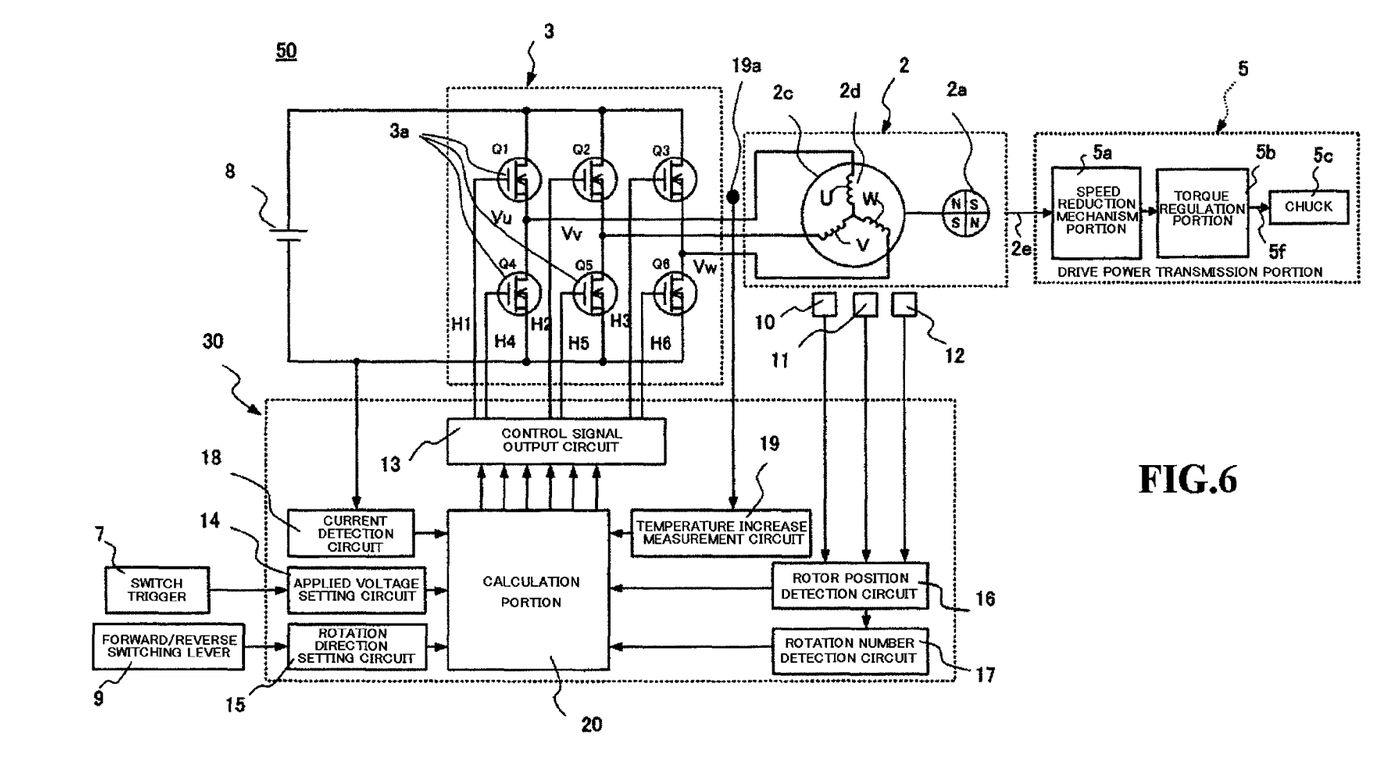
FIG. 6 is; a circuit functional block diagram of the electric power tool illustrated in FIG. 1.

FIG. 1 is a sectional view illustrating the overall structure of a cordless type driver drill according to one embodiment of the present invention. FIG. 2 is a plan view of an inverter circuit board as the driver drill illustrated in FIG. 1 is viewed from the line A-A. FIG. 3 is an enlarged configuration diagram of the principal components of the driver drill illustrated in FIG. 1. FIG. 4 is a sectional view along the line B-B of the enlarged configuration diagram of the principal components illustrated in FIG. 3. FIG. 5 is a plan view of the inverter circuit board as viewed from the line D-D in FIG. 4. FIG. 6 is a functional block diagram of the driver drill illustrated in FIG. 1.

[Overall Assembled Configuration of Electric Power Tool 50]

An overall assembled configuration of an electric power tool is first described with reference to FIG. 1. A main body of the electric power tool 50 is housed in a housing 1 that includes a body housing portion (also referred to as a "motor housing portion") 1a and a handle housing portion (also referred to as a "grip housing portion") 1b. The body housing portion (motor housing portion) 1a extends from one end (the left end in the diagram) 1c to the other end (the right end in the diagram) 1d along an shaft direction (horizontal axial direction) of a motor rotation shaft (motor shaft) 2e of a brushless motor portion (brushless DC motor portion) 2, houses the brushless motor portion 2 and an inverter circuit board 3 mounted with semiconductor switching elements 3a of an inverter circuit on the one end 1c side of the body housing portion 1a, and houses a speed reduction mechanism portion 5a and torque regulation portion (clutch portion) 5b forming a drive power transmission portion 5 on the other end 1d side of the brushless motor portion 2.

The handle housing portion (grip housing portion) 1b extends vertically downward so as to branch from the direction of the extension of the body housing portion 1a, and has an outer peripheral shape that enables gripping with one hand of an operator. A battery pack 8 functioning as a drive power source for the brushless motor 2 is detachably fitted on a lower end of the handle housing portion 1b. Also, above the battery pack 8, a control circuit board 4 for controlling the inverter circuit assembled on the inverter circuit board 3 of the brushless motor 2 is disposed so as to extend in a direction crossing the face of the page.

The brushless motor portion 2 in the present embodiment includes a three-phase brushless DC motor. The brushless motor portion 2 includes, as illustrated in the enlarged view of principal components in FIG. 3, a stator 2c having an outer tubular shape, a rotor (magnet rotor) 2a that is concentrically provided in an inner peripheral portion of a teeth portion of the stator 2c and has a permanent magnet (magnet) 2b embedded therein with N and S poles extending along the direction of the motor rotation shaft 2e, and stator coils 2d including three-phase coils U, V, and W (see FIG. 6) of the stator 2c.

The stator coils 2d are coiled in a slot via an insulation layer 2f made of an resin material so as to encompass the teeth portion (not illustrated) of the stator yoke 2c. One end of the motor rotation shaft 2e serving as a rotation shaft of the rotor 2a is supported by a first shaft bearing portion (for example, a ball bearing) 23 provided on the one end 1c of the body housing portion 1a, and the other end is supported by a second shaft bearing portion (for example, a ball bearing) 24 provided on the other end 1d side in the body housing portion 1a.

In proximity to the rotor 2a, three rotation position detection elements (Hall ICs) 10, 11, and 12 (see FIG. 6) disposed at 60° intervals with respect to a direction of rotation are disposed in order to detect a rotational position of the rotor 2a. To the three-phase coils 2d (U, V, and W) of the star-connected stator 2c, a current that is controlled to current application intervals having an electrical angle of 120° by the inverter circuit board 3 is applied on the basis of positional detection signals from the rotation position detection elements 10, 11, and 12.

As illustrated in FIG. 3, a cooling fan 25 is provided on the right end side of the motor rotation shaft 2e of the brushless motor 2, and in the body housing portion 1a in proximity to the cooling fan 25, a ventilation port (air outlet ventilation port) is formed although not illustrated. On the other hand, the inverter circuit board 3 is housed on the left end side of the motor rotation shaft 2e of the brushless motor 2. Note that a mounting structure of the inverter circuit board 3 itself and mounting arrangement of the inverter circuit board 3 in the body housing portion 1a according to the present embodiment will be described hereafter.

As illustrated in FIG. 3, an air inlet ventilation port 21 is formed on the one end 1c of the body housing portion 1a, and an air inlet ventilation port 22 is formed in proximity to the inverter circuit board 3. A cooling air flow passage in the body housing portion 1a from the air inlet ventilation ports 21 and 22 to the above-described air outlet ventilation port formed in proximity to the cooling fan 25 suppresses temperature increases of the semiconductor switching elements 3a of the inverter circuit board 3 and temperature increases of the stator coils 2d of the motor 2. In particular, a large drain current should be flowed through each of the semiconductor switching elements 3a (the switching elements Q1 to Q6 in FIG. 6), and therefore, the inverter circuit board 3 is configured to be forcibly cooled by the cooling fan 25 in order to prevent the temperature increases of the semiconductor switching element 3a resulting from the large current.

Rotational force of the motor rotation shaft 2e of the brushless motor 2 is transmitted to the speed reduction mechanism portion 5a that includes a planetary gear engaged with a pinion gear formed on the motor rotation shaft 2e. The speed reduction mechanism portion 5a includes a well-known planetary gear speed reduction mechanism provided with a pinion gear (sun gear) and a planetary gear engaged with the pinion gear and a ring gear. In the present embodiment, output of the motor rotation shaft 2e of the brushless motor 2 is transmitted to the torque regulation portion 5b as speed-reduced rotational force by a three-stage planetary gear speed reduction mechanism.

The torque regulation portion 5b is configured to be able to use biasing force of a torque regulation spring 5g to regulate a pressing force on the ring gear 5h in the final stage of the planetary gear speed reduction mechanism of the speed reduction mechanism portion 5a, and thereby regulate a set torque (load torque). If a load torque on a spindle 5f (tip tool) exceeds the set torque, the torque regulation portion 5b executes idle running of a rotation output shaft 5e of the speed reduction mechanism portion 5a to cut off transmission of the rotation to the spindle 5f.

Thus, the torque regulation portion 5b also functions as a clutch portion. The torque regulation portion 5b has a mode switching and torque regulation dial (clutch dial) 5d, and is configured to enable setting of a driver mode or a drill mode using the torque regulation dial 5d. Also, when the torque regulation dial 5d selects the driver mode, the torque regulation portion 5b can regulate the biasing force (pressing force) of the torque regulation spring 5g on the ring gear 5h by rotating the torque regulation dial 5d at a predetermined rotation angle among a plurality of stages. That is, it is possible to regulate the rotation torque, which is transmitted from the output shaft 5e of the speed reduction mechanism portion 5a to the spindle 5f according to the rotation angle of the torque regulation dial 5d, to a desired tightening torque corresponding to a load.

For example, when the load torque on the spindle 5f is less than a set value of the torque regulation dial 5d, the ring gear 5h is fixed by the pressing force of the torque regulation spring 5g and cannot rotate, and therefore the rotation of the final stage planetary gear (not illustrated) of the speed reduction mechanism portion 5a is transmitted to the spindle 5f through the ring gear 5h. As a result, it is possible to threadably insert a screw into a processed member by a tip tool (driver bit) (not illustrated) mounted detachably by a chuck 5c.

Conversely, when a load torque greater than or equal to the set value of the torque regulation dial 5d acts on the spindle 5f, the ring gear 5h is not fixed by the pressing force of the torque regulation spring 5g, and therefore the final stage planetary gear of the speed reduction mechanism portion 5a only rotates about a shaft 5i as a rotation shaft, but cannot revolve. As a result, the rotation of the final stage planetary gear is not transmitted to the spindle 5f through the ring gear 5h. Thus, a screw cannot be threadably inserted into a processed member (not illustrated) by the tip tool (driver bit) mounted on the chuck 5c.

The torque regulation dial 5d mounted on the torque regulation portion 5b enables, for example, 10 stage torque settings. If a load torque greater than or equal to a set tightening torque (sliding torque) is applied to the spindle 5f, the rotation output shaft 5e of the speed reduction mechanism portion 5a is cut off from engagement with the spindle 5f by the clutch operation of the torque regulation portion 5b, and executes idle rotation, and thereby locking of the motor 2 is prevented. Thus, when the torque regulation dial 5d is set to the driver mode, the idle rotation prevents application of an excessive lock current to the motor 2 and the inverter circuit board 3, and therefore it is possible to prevent burn out of the semiconductor switching elements 3a (Q1 to Q6), which may result from the excessive lock current.

On the other hand, on an upper end of the handle housing portion 1b, a switch trigger (trigger operation portion) 7 including a switch portion 7a is disposed, and projects from the handle housing portion 1b with being biased by spring force. The switch portion 7a is electrically connected to a switch circuit board 7b, and supplies an electrical signal corresponding to a drawing operation amount of the switch trigger 7 to the switch circuit board 7b. That is, the trigger operation amount of the switch trigger 7 is converted into a voltage value in conjunction with a movable terminal (sliding terminal) (not illustrated) of a potentiometer formed in the switch portion 7a, and then inputted to a calculation portion 20 as a set voltage for an after-mentioned applied voltage setting circuit 15 (see FIG. 6).

The battery pack 8 is electrically connected so as to supply a drive power to a control circuit 30 (see FIG. 6) that is formed on the switch circuit board 7b and the control circuit board 4, and includes a calculation function, and to supply a drive power to the inverter circuit 3 (see FIG. 6) formed on the inverter circuit board 3. The battery pack 8 includes, for example, a lithium ion secondary battery.

As illustrated in FIG. 1, the body housing portion 1a is integrally formed with the handle housing portion 1b as a synthetic resin housing 1.

Upon assembly of the electric power tool 50, the synthetic resin housing 1 is assembled such that a pair of housing members (1) including the body housing portion 1a that is divided into two each having a semicircular sectional shape by a perpendicular plane along the central axis of the motor rotation shaft 2e of the brushless motor 2, and the handle housing portion 1b is prepared; then, in one of the body housing portions 1a, the inverter circuit board 3, and the motor rotation shaft 2e, stator 2c, and the like of the brushless motor 2 are assembled as illustrated in FIG. 1; in the handle housing portion 1b, the switch circuit board 7b, the control circuit board 4, and the like are assembled; and thereafter, as illustrated in FIG. 1, the other one of the pair of housing members 1 (the integrated components including the body housing portion 1a and the handle housing portion 1b) is superimposed from above to thereby assemble the pair of housings 1 by tightening with a screw that threadably engages with a screw boss if as illustrated in FIG. 3.

Thus, in the body housing portion 1*a* and the handle housing portion 1*b*, a plurality of rib portions (thickness portions of the housings 1*a* and 1*b*) should be provided to form fixing portions or retaining portions (engagement/insertion portions) for the stator 2*c* of the brushless motor 2, the shaft bearing portions 23 and 24 of the motor rotation shaft 2*e*, and the like. For example, as illustrated in FIG. 4, a rib portion (thickness portion) 1*r* is provided to form a shaft bearing retaining portion (shaft bearing engagement/insertion portion) 1*e* for retaining the first shaft bearing portion 23 of the motor rotation shaft 2*e* on the one end 1*c* of the body housing portion 1*a*.

For this reason, it may be difficult to reduce a length of the body housing portion 1*a* with respect to the direction of the motor rotation shaft 2*e*. In particular, in the electric power tool 50 using the brushless motor 2, the inverter circuit board 3 mounted with the plurality of power transistors as the semiconductor switching elements 3*a* must be housed, and therefore there is a need to ensure an occupation space for the relatively large inverter circuit board 3 in the body housing portion 1*a*. According to the present embodiment, as described hereafter, the housing space for the inverter circuit board 3 in the body housing portion 1*a* is reduced.

[Overall Circuit Configuration of Electric Power Tool 50]

Next, a circuit configuration of the electric power tool 50 is described with reference to the circuit functional block diagram illustrated in FIG. 6. As illustrated in FIG. 6, an inverter circuit portion (3) includes the 6 power MOSFETs 3*a* (Q1 to Q6) that are the semiconductor switching elements (semiconductor power devices) 3*a* mounted on the inverter circuit board 3 described above and connected in a three-phase bridge arrangement.

The bridge-connected 6 MOSFETs (Q1 to Q6) are connected to a control signal output circuit 13, and to the star-connected stator coils U, V, and W at drains or sources thereof. Based on this, the 6 MOSFETs (Q1 to Q6) perform switching operations in response to switching drive signals H1 to H6 inputted from the control signal output circuit 13, and supply DC voltage (power) of the battery pack 8, which is applied to the inverter circuit portion 3, to the stator coils U, V, and W as three-phase (U phase, V phase, and W phase) drive voltages Vu, Vv, and Vw.

The control circuit portion 30 is provided in order to output a control signal to the control signal output circuit 13, and includes circuit devices of the switch circuit board 7*b* and the control circuit board 4 illustrated in FIG. 1. The control circuit portion 30 includes: the calculation portion 20 for functionally outputting a drive signal to the control signal output circuit 13 on the basis of a processing program and data; a rotor position detection portion 16 that detects relational positions between the rotor 2*a* and the three-phase coils U, V, and W of the stator coils 2*d* of the stator 2*c* on the basis of the output signals of the above-described three Hall ICs 10, 11, and 12, and outputs normal positional information on the rotor 2*a* to the calculation portion 20: a rotation number detection circuit 17 that detects a rotation number on the basis of a detection signal of the rotor position detection circuit 16; a temperature increase measurement circuit 19 that measures the temperature increases of the semiconductor switching elements 3*a* of the inverter circuit portion 3 by a heat sensitive element 19*a*, and outputs corresponding measurement signals to the calculation portion 20; a current detection circuit 18 that constantly detects a drive current of the motor 2, and outputs information on it to the calculation portion 20; an applied voltage setting circuit 14 for setting a duty ratio of a PWM signal corresponding to an output control signal produced in the switch portion 7*a* in response to the above-described trigger operation amount of the switch trigger 7; and a rotation direction setting circuit 15 for setting a rotation direction of the motor 2 by detecting operation for reverse or forward rotation through a forward/reverse switching lever 9 of the motor 2.

The control circuit portion 30 supplies, among switching drive signals (three-phase signals) driving respective gates of the 6 MOSFETs Q1 to Q6, three driving signals for the three negative power source side MOSFET Q4, Q5, and Q6 as pulse width modulation signals (PWM signals) H4, H5, and H6, to regulate power to the motor 2 by varying duty ratios of pulse widths of the PWM signals on the basis of the output signal from the applied voltage setting circuit 14 in response to the trigger operation for the switch trigger 7, and thus controls activation and speed of the motor 2.

The motor rotation number (rotation speed) outputted to the motor rotation shaft 2*e* of the brushless motor 2 is, as described above, decreased by the speed reduction mechanism portion 5*a* of the drive power transmission portion 5, and rotation force after the speed reduction is transmitted to the tip tool mounted on the chuck 5*c* via the torque regulation portion 5*b*.

[Disposition of Inverter Circuit Board 3 in Body Housing Portion 1*a*]

As illustrated in FIG. 2, the inverter circuit board 3 includes a substantially circular-shaped printed board formed with a wiring pattern (not illustrated), and in a central portion of the inverter circuit board 3, a through hole 3*d* for passing the motor rotation shaft 2*e* therethrough is formed. Also, on a substantially peripheral portion of the inverter circuit board 3, the 6 semiconductor switching elements 3*a* (the semiconductor switching elements Q1 to Q6 in FIG. 6) are mounted. For electrical wirings between the inverter circuit board 3 and the stator coils 2*d*, between the inverter circuit board 3 and the control circuit board 4, and between the inverter circuit board 3 and the switch circuit board 7*b*, large-current conductive wires 3*b* and small-current conductive wires 3*c* are used.

The 6 semiconductor switching elements Q1 to Q6 are respectively formed by, for example, the power MOSFETs (power insulating gate field-effect transistors) 3*a*. Each of the MOSFETs 3*a* has three terminals w corresponding to a drain electrode terminal, source electrode terminal, and gate electrode terminal, and the drain electrode terminal w is integrally formed with a heat radiation plate (heat sink) r for promoting heat diffusion at the time of overload current.

In particular, in the horizontal direction of upper and lower stages of the mounting surface of the inverter circuit board 3 (horizontal direction crossing the direction of the extension of the motor rotation shaft), two pairs of semiconductor switching elements Q1 to Q4 (semiconductor switching elements 3*a* forming a first group) are independently mounted vertically to the inverter circuit board 3 using an insertion mounting technique on the three electrode terminals w for each such that the drain heat radiation plates r (drain electrode terminals w) face each other. In other words, the two pairs of semiconductor switching elements Q1 to Q4 forming the first group are disposed to substantially display point symmetry with respect to the axial center of the motor rotation shaft 2*e*.

Also, as illustrated in FIG. 2, a pair of semiconductor switching elements Q5 and Q6 forming a second group is disposed to face each other right and left in the horizontal direction of a central stage to display point symmetry, and mounted such that one pair of three electrode terminals w is, as illustrated in FIG. 4 and FIG. 5, bent at a right angle at a midpoint, and the drain heat radiation plates r become parallel to the mounting surface of the inverter circuit board 3, and become upward.

Thus, as illustrated in FIG. 4 and FIG. 5, the drain heat radiation plates r of the first group semiconductor switching elements Q1 to Q4 are made to face the through hole 3d side, and the drain heat radiation plates r of the second group semiconductor switching elements Q5 and Q6 are disposed to face upward, so that a heat radiation effect by the drain heat radiation plates r can be ensured by circulating the cooling air taken in from the air inlet ventilation port 21 or 22 to the through hole 3d.

As illustrated in FIG. 3, the first group semiconductor switching elements Q1 to Q4 (3a), which are mounted on the inverter circuit board 3, are housed in a space in the body housing portion 1a between the shaft bearing portion 23 and the screw boss 1f such that a mounting height Hb of the semiconductor switching elements Q1 to Q4 is larger than a height (separation distance) Ha from the mounting surface to the shaft bearing portions (ball bearings) 23 retained on the shaft bearing retaining portion 1e, that is, the relationship of Hb>Ha is satisfied. That is, the semiconductor switching elements Q1 to Q4 (3a) are disposed so as to overlap with the shaft bearing portions 23 (bearing portion) in the shaft direction of the motor shaft 2e in the body housing portion 1a. In other words, so-called overlapping arrangement is created, in which, in the radial direction of the motor shaft 2e in the body housing portion 1a, the shaft bearing portions 23 are disposed, and at least portions of the semiconductor switching elements Q1 to Q4 (3a) are disposed so as to overlap with the shaft bearing portions 23.

Also, as illustrated in FIG. 4, the second group semiconductor switching elements Q5 and Q6, which are mounted on the mounting surface of the inverter circuit board, are fitted in a space in the body housing portion 1a between the mounting surface and the shaft bearing portions 23 so as to have a height Hc lower than the separation distance Ha from the mounting surface to the shaft bearing portions 23. That is, an inner wall of the rib portion 1r for forming the shaft bearing retaining portion (shaft bearing insertion portion) 1e, which is to retain the shaft bearing portions 23, is formed to have a relatively large thickness, and therefore, the mounting height Hc of the second group semiconductor switching elements Q5 and Q6 is, as illustrated in FIG. 4 and FIG. 5, limited to avoid abutting contact with the inner wall of the rib portion 1r (see FIG. 4). Also, a mounting width Ws of the second group semiconductor switching elements Q5 and Q6 is narrower than an inner wall width Wr of the rib portion 1r, that is, limited to the relationship of Ws>Wr (see FIG. 5). For this purpose, as illustrated in FIG. 4, the second group semiconductor switching elements Q5 and Q6 are mounted upward such that the insertion leads w are bent at the right angle, and the drain heat radiation plates r thereof are parallel to the mounting surface of the inverter circuit board 3.

The above housing disposition of the inverter circuit board 3 in the body housing portion 1a enables a reduction in fitting space for the inverter circuit board 3 in a shaft bearing portion chamber (ball bearing chamber) including the shaft bearing retaining portion 1e retaining the shaft bearing portions 23. Also, the mounting layout of the plurality of semiconductor switching elements 3a (Q1 to Q6) on the inverter circuit board 3 can efficiently radiate heat.

According to the above embodiment, the heat radiation effect on the semiconductor switching elements is not impeded, and as illustrated in FIG. 3, FIG. 4 and FIG. 5, the fitting space for the inverter circuit board 3 can be reduced. As a result, a dimension Le (see FIG. 3) on the one end 1c side of the body housing portion 1a can be reduced, and the overall length of the electric power tool 50 (the overall length in the direction of the extension of the body housing portion 1a) can be reduced as compared with that of a conventional electric power tool.

Also, in the present embodiment, the plurality of semiconductor switching elements 3a are provided, and a portion (Q5 and Q6) of the semiconductor switching elements 3a is provided in a prone orientation on the inverter circuit board 3, whereas the other portion (Q1 to Q4) of the semiconductor switching elements 3a is provided in an upright orientation on the inverter circuit board 3, and arranged so as to overlap with the shaft bearing portions 23, so that the mounting space for the portion (Q5 and Q6) of the semiconductor switching elements 3a, which are provided in the prone orientation on the inverter circuit board 3, can be reduced.

Further, in the present embodiment, the second group elements (Q5 and Q6) in the plurality of semiconductor switching elements 3a mounted on the mounting surface of the inverter circuit board 3 are fitted in the space in the body housing portion 1a between the mounting surface and the first shaft bearing portions 23 to have a lower height than the separation distance from the mounting surface to the first bearing support portions 23, and therefore the mounting space for the second group semiconductor switching elements 3a (Q5 and Q6) on the inverter circuit board 3 can also be reduced.

Still further, in the present embodiment, the first group semiconductor switching elements 3a (Q1 to Q4) are fitted adjacently to the first shaft bearing portions 23 in the spaces in the body housing portion 1a between the screw boss 1f and the first shaft bearing portions 23, and therefore, the dimension in the radial direction of the motor rotation shaft in the body housing portion 1a can be reduced.

As described above, the electric power tool 50 according to the present embodiment has a shorter overall length, and excellent operational or workability characteristics.

Note that, in the above embodiment, the MOSFETs are used as the semiconductor switching elements mounted on the inverter circuit board; however, besides the MOSFETs above, power transistors such as IGBTs (insulating gate bipolar transistors) or bipolar transistors can be applied. Also, in the present embodiment, the electric power tool using the three-phase inverter circuit board has been described; however, an electric power tool using an inverter circuit board or motor control circuit board other than three-phase one can also be applied.

Also, regarding the above semiconductor switching element, there has been described a structure using the insertion mounting (independent mounting) package for mounting the electrode terminals in a vertical state with respect to the inverter circuit board; however, a transistor giving a surface mounting package may be used. Further, for an electrode including the heat radiation function, such as a drain, a package structure in which a part thereof is embedded in the package may be used.

The present invention is not limited to the driver drill described above, but can be applied to a tool for tightening and/or opening holes, such as an impact driver, drill, percussion drill, or hammer drill, and further, to an electric power tool using a brushless motor, such as a round saw or jigsaw. Even in such an application range, the same effects as those in the above-described embodiments can be obtained.

Having described and illustrated the principles of this application by reference to the preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. An electric power tool including:
a motor including a motor shaft;
a housing that houses the motor, the housing having an air inlet ventilation port;
a plurality of switching elements for driving the motor, the switching elements being mounted on a circuit board, the circuit board having a through hole through which the motor shaft passes and being approximately orthogonal to the motor shaft; and
a bearing that is capable of retaining the motor shaft, wherein:
at least one of the switching elements is provided so as to overlap with the bearing in a direction of the motor shaft inside the housing, and
air taken from the air inlet ventilation port into the housing flows between the bearing and the circuit board and circulates into the motor through the through hole.

2. The electric power tool according to claim 1, wherein:
the housing includes a motor housing portion that houses the motor, and a grip housing portion that extends downward from the motor housing portion, and
the bearing and the switching elements are provided in the motor housing portion.

3. The electric power tool according to claim 2, wherein:
the housing is a left and right dividable housing, the left and right dividable housing being fixable by a screw extending in a horizontal direction,
a plurality of screw bosses for fixing the screw is provided in the motor housing portion, and
the screw bosses are approximately symmetric with each other with respect to the motor shaft in a radial direction of the motor shaft, and the bearing and the switching elements are disposed between the screw bosses in the radial direction.

4. The electric power tool according to claim 1, wherein:
the air inlet ventilation port is provided on a side surface of the housing, and
the switching elements are opposed to the air inlet ventilation port.

5. The electric power tool according to claim 4, wherein the switching elements are provided in a flow passage of the air.

6. The electric power tool according to claim 5, wherein the switching elements are provided around the through hole.

7. The electric power tool according to claim 1, wherein the circuit board is directly fixed on an insulation layer of the motor.

8. The electric power tool according to claim 1, wherein a height of each of the switching elements from the circuit board is smaller than a distance from the circuit board to a far end of the bearing.

9. An electric power tool comprising:
a brushless motor including a stator coil;
a housing that houses the brushless motor;
a circuit board housed in the housing; and
a plurality of switching elements including a first switching element and a second switching element provided on the circuit board and that allow electric current to pass through the stator coil, wherein:
the first switching element is provided on the circuit board approximately vertical with respect to the circuit board, and
the second switching element is provided on the circuit board approximately parallel with the circuit board.

10. An electric power tool including:
a motor including a motor shaft;
a housing that houses the motor; and
a plurality of switching elements for driving the motor, the switching elements being mounted on a circuit board, the circuit board being approximately orthogonal to the motor shaft,
wherein the switching elements are disposed in such a manner that a distance from a switching-element-mounting surface of the circuit board to a far end of a portion, of the switching elements along a direction of the motor shaft is different from a distance from the switching-element-mounting surface of the circuit board to a far end of another portion of the switching elements along the direction of the motor shaft.

11. The electric power tool according to claim 10, wherein a portion of the switching elements is in an upright state on the circuit board, whereas another portion of the switching elements is in a prone state on the circuit board.

12. The electric power tool according to claim 10, wherein:
the housing has a rib that retains the bearing that rotatably supports the motor shaft, and
a portion of the switching elements is disposed opposed to the rib in such a manner that a distance from the switching-element-mounting surface of the circuit board to a far end of the portion of the switching elements along the direction of the motor shaft is smaller than a distance from the switching-element-mounting surface of the circuit board to a fat end of another portion of the switching elements that is not opposed to the rib along the direction of the motor shaft.

13. The electric power tool according to claim 12, wherein the portion of the switching elements that is opposed to the rib is in a prone state on the circuit board.

14. The electric power tool according to claim 12, wherein:
the housing is a left and right dividable housing, and
the bearing is retained by ribs each of which is provided to each of left and right parts of the left and right dividable housing.

15. The electric power tool according to claim 12, wherein the other portion of the switching elements that is not opposed to the rib overlaps with the bearing in the direction of the motor shaft.

* * * * *